(12) United States Patent
Larcher et al.

(10) Patent No.: US 9,181,104 B2
(45) Date of Patent: Nov. 10, 2015

(54) COMPOSITION BASED ON ZIRCONIUM OXIDES, PRASEODYMIUM, LANTHANUM OR NEODYMIUM, METHOD FOR THE PREPARATION AND USE THEREOF IN A CATALYTIC SYSTEM

(75) Inventors: Olivier Larcher, Perigny (FR); Philippe Moissonnier, Puilboreau (FR); Emmanuel Rohart, Sainte Soulle (FR)

(73) Assignee: Rhodia Chimie, Aubervilliers (FR)

( * ) Notice: Subject to any disclaimer, the term of this patent is extended or adjusted under 35 U.S.C. 154(b) by 0 days.

(21) Appl. No.: 13/275,516

(22) Filed: Oct. 18, 2011

(65) Prior Publication Data

US 2012/0035048 A1 Feb. 9, 2012

Related U.S. Application Data

(63) Continuation of application No. 10/589,209, filed as application No. PCT/FR2005/000455 on Feb. 25, 2005, now abandoned.

(30) Foreign Application Priority Data

Feb. 26, 2004 (FR) ..................................... 04 01948

(51) Int. Cl.
*B01J 23/10* (2006.01)
*C01G 25/00* (2006.01)
*B01D 53/94* (2006.01)
*B01J 23/63* (2006.01)
*B01J 37/00* (2006.01)
*B01J 37/03* (2006.01)
*B01J 21/06* (2006.01)
*B01J 35/10* (2006.01)

(52) U.S. Cl.
CPC .............. *C01G 25/00* (2013.01); *B01D 53/945* (2013.01); *B01J 23/10* (2013.01); *B01J 23/63* (2013.01); *B01J 37/0018* (2013.01); *B01J 37/03* (2013.01); *C01G 25/006* (2013.01); *B01D 2255/206* (2013.01); *B01D 2255/20715* (2013.01); *B01J 21/066* (2013.01); *B01J 35/1014* (2013.01); *C01P 2006/12* (2013.01); *C01P 2006/13* (2013.01); *Y02T 10/22* (2013.01)

(58) Field of Classification Search
CPC ........ B01J 23/10; B01J 23/63; B01J 37/0018; B01J 37/03; B01J 21/066; B01J 21/06; B01J 35/1014; B01D 53/945; C01G 25/00; C01G 25/006; C01G 25/002; Y02T 10/22; C01P 2006/12; C01P 2006/13
See application file for complete search history.

(56) References Cited

U.S. PATENT DOCUMENTS

| | | | | |
|---|---|---|---|---|
| 5,063,192 | A | * 11/1991 | Murakami et al. | ............ 502/303 |
| 5,252,316 | A | 10/1993 | Kriechbaum et al. | |
| 5,607,892 | A | 3/1997 | Chopin et al. | |
| 6,171,572 | B1 * | 1/2001 | Aozasa | .................... 423/594.12 |
| 6,214,306 | B1 | 4/2001 | Aubert et al. | |
| 2002/0071806 | A1* | 6/2002 | Sabacky et al. | ............... 423/593 |
| 2003/0224931 | A1 | 12/2003 | Yamamoto et al. | |
| 2004/0234439 | A1* | 11/2004 | Takeshima et al. | ........... 423/263 |
| 2008/0187476 | A1 | 8/2008 | Larcher et al. | |

FOREIGN PATENT DOCUMENTS

| | | |
|---|---|---|
| EP | 0 808 800 A2 | 11/1997 |
| EP | 0 955 267 A1 | 11/1999 |
| EP | 1 035 074 A1 | 9/2000 |
| EP | 1 285 881 A1 | 2/2003 |
| FR | 2 736 343 | 1/1997 |
| FR | 2 829 129 | 3/2003 |
| JP | 2000-319019 A | 11/2000 |
| WO | 92/11223 A1 | 7/1992 |
| WO | WO 98/45212 | 10/1998 |
| WO | WO 03/020643 A1 | 3/2003 |

OTHER PUBLICATIONS

S. Brunauer et al., "Adsorption of Gases in Multimolecular Layers", *J. Am Chem. Soc.*, vol. 60, Feb. 1938, pp. 309-319.

* cited by examiner

*Primary Examiner* — Melvin C Mayes
*Assistant Examiner* — Smita Patel

(57) ABSTRACT

The composition is based on zirconium oxide and at least one additive selected from zirconium oxide and at least one additive chosen from praseodymium, lanthanum or neodymium oxides, has a specific surface of at least 29 m 2/g after calcination at 1000° C. during a period of 10 hours and is obtained by a method wherein a mixture of zirconium compounds and additive is precipitated with a base; the medium thus obtained, containing a precipitate, is heated and a compound chosen from anionic surfactants, non-ionic surfactants, polyethylene glycols, carboxylic acids and the salts thereof and surfactants such as the ethoxylates of caroboxymethyl fatty alcohols is added to the compound and the precipitate is calcinated; the composition can be used as a catalyst.

30 Claims, No Drawings

COMPOSITION BASED ON ZIRCONIUM OXIDES, PRASEODYMIUM, LANTHANUM OR NEODYMIUM, METHOD FOR THE PREPARATION AND USE THEREOF IN A CATALYTIC SYSTEM

RELATED APPLICATIONS

The present application is a continuation of U.S. patent application Ser. No. 10/589,209, filed May 14, 2007, now abandoned, which is a National Stage filing under 35 U.S.C. 371 of International Application No. PCT/FR2005/000455, filed Feb. 25, 2005, and which claims priority under 35 U.S.C. 119 to French Patent Application No. 04 01948, filed Feb. 26, 2004. The entire contents of each of these applications are hereby incorporated by reference in this application.

The present invention relates to a composition based on zirconium oxide, on an additive selected from the oxides of praseodymium, lanthanum and neodymium, its method of preparation and its use in a catalytic system.

Catalysts called multifunctional catalysts are used at the present time for treating exhaust gases of internal combustion engines (automobile postcombustion catalysis). Multifunctional catalysts are catalysts capable not only of obtaining the oxidation of the carbon monoxide and hydrocarbons present in the exhaust gases, but also of reducing the nitrogen oxides also present in these gases ("three-way" catalysts). Catalysts based on zirconium oxide or cerium oxide are known today as particularly advantageous for this type of reaction.

To be effective, these catalysts must have a high specific surface area, and there is a continuing search for catalysts which can be used at increasingly high temperatures, and, for this purpose, have a more stable specific surface area.

Thus it is the object of the invention to develop a catalytic composition to meet this requirement.

For this purpose, the composition of the invention is based on zirconium oxide and is characterized in that it further comprises at least one additive selected from the oxides of praseodymium, lanthanum and neodymium, and in that it has a specific surface area of at least 29 m$^2$/g after calcination for 10 hours at 1000° C.

The composition of the invention thereby has the advantage of preserving a high specific surface area at a temperature of 1000° C. or even more. Furthermore, the catalysts based on this composition may also have high efficiency at low temperature even with a low precious metal content.

Other features, details and advantages of the invention will appear even more clearly from a reading of the description that follows, and from the various concrete but nonlimiting examples provided to illustrate it.

In the rest of the description, specific surface area means the BET specific surface area determined by nitrogen adsorption according to standard ASTM D 3663-78 established using the Brunauer-Emmett-Teller method described in the periodical The Journal of the American Chemical Society, 60, 309 (1938).

The periodic table of elements referred to in the present description is the one published in the Supplement au Bulletin de la Société Chimique de France No. 1 (January 1966). Rare earth means elements of the group consisting of yttrium and the elements of the periodic table with atomic numbers of 57 to 71 inclusive.

Furthermore, the calcinations after which the surface area values are given are calcinations in air unless otherwise indicated.

The contents are given as oxides unless otherwise indicated.

The main features of the compositions of the invention are the nature of their components and their specific surface area.

The compositions of the invention are based on zirconium oxide $ZrO_2$, this oxide being the essential or majority component. The compositions further comprise at least one additive, which constitutes the remainder of the composition and which is present in the form of an oxide, this additive being selected from praseodymium, lanthanum and neodymium. It should be observed here that the invention obviously covers the case of compositions comprising a combination of additives.

The additive content does not exceed 50% by weight, the zirconium oxide constituting at least 50% by weight of the composition. This content is expressed as the weight of oxide of the additive or of all the additives in the case of compositions containing several additives, with respect to the weight of the composition as a whole (zirconium oxide plus additive oxide(s)). This additive content may vary in a wide range and more particularly between 5% and 40% and most particularly between 10% and 40%. This content may be quite particularly between 10% and 30%.

According to one variant, the compositions of the invention may further comprise aluminum oxide $Al_2O_3$. In this case, the aluminum content ($Al_2O_3$ weight % with respect to the total composition) is generally not more than 20%, and, preferably, is between 1% and 10%.

According to another variant, the compositions of the invention may further comprise silica in proportions identical to those given above for alumina.

The other main feature of the compositions of the invention is their high specific surface area at high temperature.

As stated above, this area is at least 29 m$^2$/g, after calcination for 10 hours at 1000° C. Under the same calcination conditions, this area may be at least 35 m$^2$/g, or even at least 40 m$^2$/g and even more preferably at least 50 m$^2$/g. Areas of about 60 m$^2$/g may be reached.

At even higher calcination temperatures, the compositions of the invention preserve high surface areas. Thus, after calcination for 4 hours at 1100° C., these compositions may have a specific surface area of at least 10 m$^2$/g or even at least 15 m$^2$/g. Areas of about 20 m$^2$/g may be obtained.

Furthermore, after calcination for 10 hours at 1200° C., the compositions of the invention may still have a specific surface area of at least 2 m$^2$/g and more particularly of at least 3 m$^2$/g.

At lower temperatures than those mentioned above, for example after calcination for 4 hours at 900° C., and according to the variants of the invention, the compositions may have a specific surface area of at least 45 m$^2$/g, more particularly of at least 50 m$^2$/g and preferably of at least 55 m$^2$/g and even more preferably of at least 70 m$^2$/g. Areas of about 80 m$^2$/g may be obtained.

The compositions of the invention may in certain cases be in the form of solid solutions of the additive in the zirconium oxide.

In this case, the XR diffraction diagrams of these compositions reveal the existence of a single phase corresponding to that of a zirconium oxide crystallized in the cubic system or in the quadratic system, thereby reflecting the incorporation of the additive in the crystal lattice of the zirconium oxide, and hence the production of a true solid solution. The compositions may also be in the form of a mixture of phases, particularly in the case of high additive contents, that is of at least 40%.

The compositions of the invention also have a specific porosity. They in fact contain mesopores, that is pores between 10 nm and 500 nm in size, even after calcination at high temperature. These size values are obtained by mercury porosimetry (analysis performed with an Autopore 9410 porosimeter, manufactured by Micromeritics, comprising two low pressure stations and one high pressure station). These mesopores may contribute a high proportion of the total pore volume, for example, they may contribute at least 30%, more particularly at least 40% of the total pore volume.

The compositions of the invention may have a very low sulfate anion content. This content is generally not more than 100 ppm and preferably not more than 50 ppm ($SO_4^-$/total composition weight ratio).

The method for preparing the compositions of the invention will now be described.

This method is characterized in that it comprises the following steps:
  (a) a mixture is formed comprising compounds of zirconium, of additive and, if applicable, of aluminum or silicon;
  (b) said mixture is contacted with a basic compound whereby a precipitate is obtained;
  (c) said precipitate is heated in liquid medium;
  (d) a compound is added to the precipitate obtained in the preceding step, selected from anionic surfactants, nonionic surfactants, polyethyleneglycols, carboxylic acids and salts thereof, and surfactants of the carboxymethylated fatty alcohol ethoxylate type;
  (e) the precipitate thereby obtained is calcined.

The first step of the method thus consists in preparing a mixture in liquid medium of a zirconium compound, a compound of the additive and, optionally, a compound of aluminum or silicon.

The mixing is generally carried out in a liquid medium which is preferably water.

The compounds are preferably soluble compounds. This may be the case particularly of salts of zirconium, of the additive and of aluminum. These compounds may be selected for example from nitrates, acetates or chlorides.

As examples, mention can be made of zirconyl nitrate or zirconyl chloride. Zirconyl nitrate is the most commonly used.

It is also possible to use a sol as a starting compound for zirconium. Sol means any system consisting of fine solid particles of colloidal size, that is, dimensions of between 1 nm and about 500 nm, based on a zirconium compound, this compound generally being a zirconium oxide and/or a zirconium oxide hydrate, in suspension in an aqueous liquid phase, said particles also optionally containing residual quantities of bound or adsorbed ions such as, for example, nitrates, acetates, chlorides or ammoniums. It may be observed that in such a sol, the zirconium may be entirely in colloidal form, or simultaneously in the form of ions and colloids.

As silicon compounds, use can be made of a silicate of an alkali element, for example sodium, a silicon alkoxide or an alkylsiliconate of an alkali element such as sodium or potassium, and mention can be made of potassium methyl siliconate as an example. Use can also be made of a solution of silicic acid or a precipitated silica which can be obtained from the preceding precursors. Mention can also be made as a silicon compound of a pyrogenated silica, for example of the Aerosil® type produced by Degussa. The silica may be present in the form of a sol or a suspension.

The starting mixture may be obtained either from compounds initially in the solid state which are introduced subsequently into the bottom of a water tank, for example, or directly from solutions of these compounds followed by mixing of said solutions in any order.

In the second step (b) of the method, said mixture is contacted with a basic compound. Products of the hydroxide type can be used as a base or basic compound. Mention can be made of alkali or alkaline earth hydroxides. Use can also be made of secondary, tertiary or quaternary amines. However, amines and aqueous ammonia may be preferred insofar as they decrease the risk of pollution by alkali or alkaline earth cations. Mention can also be made of urea.

The basic compound is generally used in the form of an aqueous solution.

The method for contacting the mixture and the solution, that is, the order of introduction thereof, is not critical. However, this contacting can be obtained by introducing the mixture into the solution of the basic compound.

The contacting or the reaction between the mixture and the solution, particularly the addition of the mixture to the solution of the basic compound, can be carried out in a single step, gradually or continuously, and it is preferably carried out with stirring. It is preferably carried out at ambient temperature (20-25° C.).

The next step (c) of the method is the heating of the precipitate in liquid medium.

This heating can be carried out directly on the reaction medium obtained after reaction with the basic compound or on a suspension obtained after separation of the precipitate from the reaction medium, optional washing and replacement of the precipitate in water. The temperature to which the medium is heated is at least 100° C. and even more particularly at least 130° C. The heating operation can be carried out by introducing the liquid medium into a closed chamber (closed reactor of the autoclave type). Under the temperature conditions given above, and in aqueous medium, as an illustration, the pressure in the closed reactor may vary between a value above 1 bar ($10^5$ Pa) and 165 bar ($1.65 \times 10^7$ Pa), preferably between 5 bar ($5 \times 10^5$) and 165 bar ($1.65 \times 10^7$ Pa). The heating can also be carried out in an open reactor for temperatures close to 100° C.

The heating can be carried out either in air, or in an inert gas atmosphere, preferably nitrogen in the latter case.

The heating time may vary within wide limits, for example between 1 and 48 hours, preferably between 2 and hours. Similarly, the temperature rise rate is not critical, and the desired reaction temperature can thereby be reached by heating the medium, for example, for between 30 minutes and 4 hours, these values being given entirely for guidance.

Several beatings can be carried out. Thus, the precipitate obtained after the heating step and optionally a washing, can be replaced in suspension in water, and the medium thereby obtained again heated. This second heating is carried out under the same conditions as those described for the first.

The next step (d) of the method consists in adding, to the precipitate from the preceding step, a compound selected from anionic surfactants, nonionic surfactants, polyethyleneglycols and carboxylic acids and salts thereof.

As regards this compound, reference can be made to the teaching of application WO-98/45212 and the surfactants described in this document can be used.

As anionic surfactants, mention can be made of ethoxycarboxylates, ethoxylated fatty acids, sarcosinates, phosphate esters, sulfates such as alcohol sulfates, ether alcohol sulfates and alkanolamide sulfate ethoxylates, sulfonates such as sulfosuccinates, alkylbenzene or alkylnaphthalenesulfonates.

As nonionic surfactants, mention can be made of acetylenic surfactants, alcohol ethoxylates, alkanolamides, amine oxides, ethoxylated alkanolamides, long chain ethoxylated amines, ethylene oxide/propylene oxide copolymers, derivatives of sorbiatan, ethylene glycol, propylene glycol, glycerol, polyglyceryl esters and their ethoxylated derivatives, alkylamines, alkylimidazolines, ethoxylated oils and alkylphenol ethoxylates. Mention can be made particularly of products sold under the trademarks IGEPAL®, DOWANOL®, RHODAMOX® and ALKAMIDE®.

As regards the carboxylic acids, use can be made particularly of aliphatic mono- or dicarboxylic acids, and among them more particularly saturated acids. Use can also be made of fatty acids and more particularly saturated fatty acids. Mention can thus be made particularly of formic, acetic, propionic, butyric, isobutyric, valeric, caproic, caprylic, capric, lauric, myristic, palmitic acids. As dicarboxylic acids, mention can be made of oxalic, malonic, succinic, glutaric, adipic, pimelic, suberic, azelaic and sebacic acids.

Carboxylic acid salts can also be used, particularly ammoniacal salts.

For example, mention can be made more particularly of lauric acid and ammonium laurate.

Finally, it is possible to use a surfactant selected from caboxymethylated fatty alcohol ethoxylates.

Carboxymethylated fatty alcohol ethoxylates means products consisting of ethoxylated or propoxylated fatty alcohols comprising a —CH$_2$—COOH group at the end of the chain.

These products may answer to the formula:

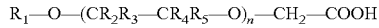

$$R_1-O-(CR_2R_3-CR_4R_5-O)_n-CH_2-COOH$$

where $R_1$ denotes a saturated or unsaturated carbon chain, of which the length is generally not more than 22 carbon atoms, preferably at least 12 carbon atoms; $R_2$, $R_3$, $R_4$ and $R_5$ may be identical and represent hydrogen or $R_2$ may represent a CH$_3$ group and $R_3$, $R_4$ and $R_5$ represent hydrogen; n is a nonzero integer of up to 50 and more particularly of between 5 and 15, these values being inclusive. It should be noted that a surfactant may consist of a mixture of products with the above formula, for which $R_1$ may be saturated and unsaturated respectively, or products comprising both —CH$_2$—CH$_2$—O— and —C(CH$_3$)—CH$_2$—O— groups.

The surfactant can be added in two ways. It may be added directly to the suspension of precipitate issuing from the preceding heating step (c). It may also be added to the solid precipitate after it has been separated by any known means from the medium in which the heating has taken place.

The quantity of surfactant used, expressed as a percentage by weight of surfactant of the weight of the composition calculated as oxide, is generally between 5% and 100%, more particularly between 15% and 60%.

In the case of the addition of the surfactant to the suspension of precipitate, it is possible, after separating the precipitate from the liquid medium, to wash the precipitate thereby obtained.

According to a variant of the inventive method, it is possible, on completion of step (d) just described, to grind the precipitate.

This grinding can be carried out in various ways.

A first way is to carry out a high energy grinding of the wet grinding type. Such a grinding is carried out on a wet precipitate which has, for example, been obtained after adding the surfactant to the solid precipitate. Wet grinding can be carried out in a ball mill, for example.

A second way is to carry out grinding at medium energy by subjecting a suspension of the precipitate to shearing, for example by using a colloidal grinder or a turbomixer. This suspension may be an aqueous suspension that has been obtained after replacing the precipitate obtained on completion of the steps (d) in a dispersion in water.

In a final step of the inventive method, the precipitate recovered is then calcined. This calcination serves to develop the crystallinity of the product formed, and it may also be adjusted and/or selected according to the subsequent temperature of use reserved for the composition according to the invention, and taking account of the fact that the specific surface area of the product decreases with rising calcination temperature. Such a calcination is generally carried out in air, but a calcination carried out, for example, in inert gas or controlled (oxidizing or reducing) atmosphere is obviously not excluded.

In practice, the calcination temperature is generally limited to a range of values of between 500° C. and 1100° C., more particularly between 600° C. and 900° C.

The compositions of the invention as described above or those obtained in the method previously examined are in the form of powders, but they can optionally be shaped into granules, beads, cylinders or honeycombs of variable dimensions.

The compositions of the invention can be used as catalysts or catalyst supports. Thus, the invention also relates to catalytic systems comprising the compositions of the invention. For such systems, these compositions may thus be applied to any support commonly used in the field of catalysis, that is, particularly thermally inert supports. This support may be selected from alumina, titanium dioxide, cerium oxide, silica, spinels, zeolites, silicates, crystalline aluminum silicate phosphates, crystalline aluminum phosphates.

The compositions may also be used in catalytic systems comprising a wash coat with catalytic properties and based on these compositions, on a substrate of the type, for example, of a metal or ceramic monolith. The wash coat may also comprise a support of the type of those mentioned above. This wash coat is obtained by mixing the composition with the support to form a suspension which can then be deposited on the substrate.

In the case of these uses in catalysis, the compositions of the invention are employed in combination with transition metals, thereby playing the role of a support for these metals. Transition metals means elements of groups IIIA to IIB of the periodic table. As transition metals, mention can be made more particularly of iron, manganese and copper, as well as precious metals, such as platinum, rhodium, palladium, silver or iridium. The nature of these metals and the techniques for incorporating them in the support compositions are well known to a person skilled in the art. For example, the metals may be incorporated in the compositions by impregnation.

The contents of abovementioned metal in the compositions correspond to the contents commonly used in catalysts to obtain catalytic activity. For example, this content is not higher than 5%, particularly not higher than 1%. It may more particularly be not higher than 0.5% and even not higher than 0.25%. Contents above 5% are generally not economically advantageous. These contents are expressed as a weight percentage of metal with respect to the composition.

The catalytic systems and more particularly the compositions of the invention can find numerous applications. They are thus particularly suitable for, and hence usable in, the catalysis of various reactions such as, for example, dehydration, hydrosulfurization, hydrodenitrification, desulfurization, hydrodesulfurization, dehydrohalogenation, reforming, steam reforming, cracking, hydrocracking, hydrogenation, dehydrogenation, isomerization, dismutation, oxychlorination, dehydrocyclization of hydrocarbons or other organic compounds, oxidation and/or reduction reactions, the Claus reaction, the treatment of exhaust gases of internal combustion engines, demetallation, methanation, shift conversion, catalytic oxidation of soot emitted by internal combustion engines such as lean burn diesel or gasoline engines.

The catalytic systems and more particularly the compositions of the invention are particularly appropriate for the treatment of exhaust gases of internal combustion engines such as lean burn diesel or gasoline engines. This treatment may be more precisely a treatment to remove NOx by a continuous reaction with the hydrocarbons in a lean mixture (HC-DeNOx catalysis).

Accordingly, the invention also relates to a method for treating exhaust gases of internal combustion engines, which is characterized in that a catalytic system such as described above, or a composition according to the invention and such as described above is used as the catalyst.

It should finally be observed that in a method of this type, the compositions of the invention can be used in combination with compositions based on cerium oxide stabilized by additives such as zirconium oxide or a rare earth oxide, zirconium oxide and the rare earth oxide being usable in combination in this case, or in combination with compositions based on zirconium oxide, this oxide also optionally being doped or stabilized by a rare earth, such as cerium particularly. These combinations lead to systems suitable for converting all the pollutants emitted by an engine from the low temperatures.

Examples will now be provided.

EXAMPLE 1

This example concerns a composition with 60% zirconium and 40% praseodymium, these proportions being expressed as weight percentages of the oxides $ZrO_2$ and $Pr_6O_{11}$.

In a stirred beaker, 500 ml of zirconium nitrate (120 g/l) and 80 ml of praseodymium nitrate (500 g/l) are introduced. Distilled water is then added to make up to a volume of 1 liter of a solution of nitrates.

In a stirred reactor, 224 ml of an aqueous ammonia solution (12 mol/l) are introduced and distilled water added to make up to a total volume of 1 liter.

The nitrate solution is introduced in one hour into the reactor with constant stirring.

The solution obtained is placed in a stainless steel autoclave equipped with a stirrer. The temperature of the medium is raised to 150° C. with stirring for 2 hours.

The suspension thus obtained is filtered on a Buchner funnel. A precipitate containing 19% by weight of oxide is recovered.

100 g of this precipitate are taken.

Simultaneously, an ammonium laurate gel is prepared under the following conditions: 250 g of lauric acid are introduced into 135 ml of aqueous ammonia (12 mol/l) and 500 ml of distilled water, and the mixture blended using a spatula.

22.7 g of this gel are added to 100 g of the precipitate and the combination is mixed until a uniform paste is obtained.

The product obtained is then heated to 500° C. for 4 hours in steps.

It has the following surface characteristics:

TABLE 1

| Calcination Time/Temperature | Area in $m^2/g$ |
| --- | --- |
| 10 h/1000° C. | 29 |
| 4 h/1100° C. | 17 |
| 10 h/1200° C. | 4 |
| 4 h/900° C. | 55 |

The XR analyses show that between 900° C. and 1000° C., the product has a majority cubic phase and a minority quadratic phase.

The total pore volume measured is 0.81 ml/g of oxide. The pores between 10 nm and 500 nm in diameter constitute 39% of the total pore volume.

EXAMPLE 2

This example concerns a composition with 85% zirconium and 15% praseodymium, these proportions being expressed as weight percentages of the oxides $ZrO_2$ and $Pr_6O_{11}$.

In a stirred beaker, 708 ml of zirconium nitrate (120 g/l) and 30 ml of a solution of praseodymium nitrate (500 g/l) are introduced. Distilled water is added to make up to a total volume of 1 liter of a solution of nitrates.

In a stirred reactor, 220 ml of an aqueous ammonia solution are introduced and distilled water added to make up to a total volume of 1 liter.

The nitrate solution is introduced in one hour into the reactor with constant stirring.

The solution obtained is placed in a stainless steel autoclave equipped with a stirrer. The temperature of the medium is raised to 150° C. with stirring for 2 hours.

The suspension thus obtained is filtered on a Büchner funnel. A precipitate containing 17.9% by weight of oxide is recovered.

100 g of this precipitate are taken.

Simultaneously, an ammonium laurate gel is prepared under the following conditions: 250 g of lauric acid are introduced into 135 ml of aqueous ammonia (12 mol/l) and 500 ml of distilled water, and the mixture blended using a spatula.

21.4 g of this gel are added to 100 g of the precipitate and the combination is mixed until a uniform paste is obtained.

The product obtained is then heated to 500° C. for 4 hours in steps.

It has the following surface characteristics:

TABLE 2

| Calcination Time/Temperature | Area in $m^2/g$ |
| --- | --- |
| 10 h/1000° C. | 41 |
| 4 h/1100° C. | 19 |
| 10 h/1200° C. | 3 |
| 4 h/900° C. | 63 |

The XR analyses show that between 900° C. and 1000° C., the product has a single quadratic phase.

EXAMPLE 3

This example concerns a composition containing 90% zirconium and 10% praseodymium, these proportions being expressed as weight percentages of the oxides $ZrO_2$ and $Pr_6O_{11}$.

The same procedure is followed as in Example 1.

The surface characteristics are given in Table 3 below. The XR analyses show that between 900° C. and 1000° C., the product has a single quadratic phase.

EXAMPLE 4

This example concerns a composition containing 90% zirconium and 10% lanthanum, these proportions being expressed as weight percentages of the oxides $ZrO_2$ and $La_2O_3$.

The same procedure is followed as in Example 1.

The surface characteristics are given in Table 3 below.

EXAMPLE 5

This example concerns a composition containing 90% zirconium and 10% neodymium, these proportions being expressed as weight percentages of the oxides $ZrO_2$ and $Nd_2O_3$.

The same procedure is followed as in Example 1.

The surface characteristics are given in Table 3 below.

TABLE 3

| Area ($m^2/g$) | Calcination Time/Temperature | | |
|---|---|---|---|
| Example | 10 h/1000° C. | 10 h/1200° C. | 4 h/900° C. |
| 3 | 40 | 2 | 59 |
| 4 | 41 | 2 | 67 |
| 5 | 34 | 4 | 54 |

EXAMPLE 6

This example describes a catalytic test for a catalyst prepared using a composition according to the invention.

a) Preparation of the Catalyst

The catalyst containing 0.1% by weight of metal rhodium element with respect to the total weight of catalyst is prepared by wet impregnation of rhodium nitrate on the product of Example 3 obtained after 4 h of calcination at 500° C. The impregnated product is then subjected to slow evaporation, drying, and finally, calcination in air for 4 h at 500° C.

The catalyst in powder form is then aged for 6 hours at 1100° C. in a redox mixture (alternating streams of 5 minutes of 1.8% CO and 10% $H_2O$, and of 1.8% $O_2$ and 10% $H_2O$). The catalyst is then aged in a quartz tubular fired heater, traversed by the gas stream.

b) Test Conditions

Gas flow rate: 30 l/h

Catalyst weight: 20 mg (grain size fraction 100-200 microns) diluted with 150 mg of SiC.

The composition of the gases is given in Table 4 below.

TABLE 4

| Component | Lean Mixture Fuel-Air Ratio: 0.979% by volume | Rich Mixture Fuel-Air Ratio: 1.024% by volume |
|---|---|---|
| $CO_2$ | 14.00 | 14.00 |
| $H_2O$ | 10.00 | 10.00 |
| CO | 0.40 | 1.40 |
| $O_2$ | 0.80 | 0.40 |
| $C_3H_6$ | 0.0375 | 0.0375 |
| $C_3H_8$ | 0.0125 | 0.0125 |
| NO | 0.095 | 0.095 |
| $N_2$ | Complement to 100 | Complement to 100 |

The following results are observed.

In a rich mixture, the initiation temperature at 20% conversion for NO is 345° C., for $C_3H_6$ it is 350° C. Hence these are low temperatures in both cases.

Furthermore, the half-conversion (50% conversion) temperature for NO and $C_3H_6$ is only 360° C. 100% of NO and $C_3H_6$ are converted before 400° C.

In the lean mixture, the initiation temperatures at 20% conversion for NO, for $C_3H_6$ and for CO are 310° C., 325° C. and 285° C. respectively. Moreover, for $C_3H_6$ 80% conversion is obtained at 500° C.

All these results reveal the low temperature effectiveness of the catalysts based on compositions of the invention.

COMPARATIVE EXAMPLE 7

In this example, a composition is prepared based on zirconium and cerium oxides, with a specific surface area stabilized by lanthanum and neodymium oxides. This composition answers to the formula $ZrO_2/CeO_2/La_2O_3/Nd_2O_3$ with respective weight proportions of these oxides of 75/20/2.5/2.5.

The same procedure is followed as in Example 2, using the following quantities of solutions per 100 g of product:
- 268 ml of zirconium nitrate (C=280 g/l)
- 79 ml of cerium nitrate (in a concentration of 236.5 g/l of $Ce^{4+}$, 15.5 g/l of $Ce^{3+}$ and free acidity of 0.7N)
- 5.5 ml of lanthanum nitrate (C=454 g/l)
- 4.8 ml of neodymium nitrate (C=524 g/l)

The method of preparation is identical to the one described in Example 2. However, the precipitate is not mixed with the surfactant, but is directly calcined. The product obtained after calcination for 4 hours at 1000° C. has a specific surface area of 44 $m^2/g$ and, after calcination for 4 hours at 1100° C., a specific surface area of 18 $m^2/g$. A catalyst containing 0.1% by weight of metal rhodium element with respect to the total weight of catalyst is also prepared by the wet impregnation of rhodium nitrate on the composition prepared as described above and obtained after 4 hours of calcination at 500° C.

This catalyst thereby prepared is subjected to the same aging at 1100° C. and the same test as described above in Example 6.

Table 5 below gives the results for initiation temperatures at 20% (Ta) for the products of Examples 6 and 7.

TABLE 5

| Catalyst | TaNO Lean mixture (° C.) | $TaC_3H_6$ Lean mixture (° C.) | TaNO Rich mixture (° C.) | $TaC_3H_6$ Rich mixture (° C.) |
|---|---|---|---|---|
| Example 7 | 385 | 400 | 405 | 430 |
| Example 6 | 310 | 325 | 345 | 350 |

The initiation temperatures are much higher in the case of the product of the comparative example.

EXAMPLE 8

This example concerns a composition containing 80% zirconium and 20% praseodymium, these proportions being expressed as weight percentages of the oxides $ZrO_2$ and $Pr_6O_{11}$.

In a stirred beaker, 276 ml of zirconium nitrate (290 g/l) and 40 ml of praseodymium nitrate (500 g/l) are introduced. Distilled water is added to make up the volume to a total of 1 liter of a solution of nitrates.

In a stirred reactor, 193 ml of an aqueous ammonia solution (12 mol/l) are introduced and distilled water then added to make up to a total volume of 1 liter.

The nitrate solution is introduced in one hour into the reactor with constant stirring.

The solution obtained is placed in a stainless steel autoclave equipped with a stirrer. The temperature of the medium is raised to 150° C. for 4 hours with stirring.

40 grams of lauric acid is added to the suspension thereby obtained. This suspension is maintained with stirring for 1 hour.

This suspension is then filtered on a Büchner funnel and the equivalent in volume of the filtration mother liquors is added to the filter precipitate. A precipitate is finally recovered.

The product obtained is then heated to 700° C. for 4 hours in steps.

It has the following surface area characteristics:

TABLE 6

| Calcination Time/Temperature | Area in m²/g |
| --- | --- |
| 10 h/1000° C. | 59 |
| 4 h/1100° C. | 20 |
| 10 h/1200° C. | 3 |
| 4 h/900° C. | 79 |

The XR analyses show that between 900° C. and 1000° C., the product has a majority cubic phase and a minority quadratic phase.

EXAMPLE 9

This example concerns a composition containing 90% zirconium and 10% praseodymium, these proportions being expressed as weight percentages of the oxides $ZrO_2$ and $Pr_6O_{11}$.

The same procedure is followed as in Example 1, with two exceptions: the surfactant is added in the form of lauric acid (33 grams) directly to the suspension issuing from the autoclave and after cooling, and the initial calcination is carried out at 800° C. for 3 hours.

The product has the following surface characteristics:

TABLE 7

| Calcination Time/Temperature | Area in m²/g |
| --- | --- |
| 10 h/1000° C. | 38 |
| 4 h/1100° C. | 20 |
| 10 h/1200° C. | 2 |
| 4 h/900° C. | 59 |

The total pore volume measured is 1.32 ml/g of oxide. The pores between 10 nm and 500 nm in diameter constitute 48% of the total pore volume.

The invention claimed is:

1. A calcined composition consisting of zirconium oxide and at least one additive, the at least one additive being selected from the group consisting of oxides of praseodymium, lanthanum and neodymium, the composition having mesopores between 10 nm and 500 nm in diameter, the mesopores being present in an amount of at least 30% of the total pore volume, the composition being capable of having a specific surface area of at least 29 m²/g after calcining for 10 hours at 1000° C.

2. The composition as claimed in claim 1, wherein the additive content is 5% to 40% by weight of additive oxide with respect to the weight of the composition.

3. The composition as claimed in claim 1, the composition being 60% zirconium oxide and 40% praseodymium oxide, based on weight percentages of the oxides $ZrO_2$ and $Pr_6O_{11}$, respectively.

4. The composition as claimed in claim 1, the composition being 85% zirconium oxide and 15% praseodymium oxide, based on weight percentages of the oxides $ZrO_2$ and $Pr_6O_{11}$, respectively.

5. The composition as claimed in claim 1, the composition being 90% zirconium oxide and 10% praseodymium oxide, based on weight percentages of the oxides $ZrO_2$ and $Pr_6O_{11}$, respectively.

6. The composition as claimed in claim 1, the composition being 90% zirconium oxide and 10% lanthanum oxide, based on weight percentages of the oxides $ZrO_2$ and $La_2O_3$, respectively.

7. The composition as claimed in claim 1, the composition being 90% zirconium oxide and 10% neodymium oxide, based on weight percentages of the oxides $ZrO_2$ and $Nd_2O_3$, respectively.

8. The composition as claimed in claim 1, the composition being 80% zirconium oxide and 20% praseodymium oxide, based on weight percentages of the oxides $ZrO_2$ and $Pr_6O_{11}$, respectively.

9. The composition as claimed in claim 1, the composition being capable of having a specific surface area of at least 35 m²/g after calcining for 10 hours at 1000° C.

10. The composition as claimed in claim 2, the composition being capable of having a specific surface area of at least 35 m²/g after calcining for 10 hours at 1000° C.

11. The composition as claimed in claim 9, the composition being capable of having a specific surface area of at least 40 m²/g after calcining for 10 hours at 1000° C.

12. The composition as claimed in claim 10, the composition being capable of having a specific surface area of at least 40 m²/g after calcining for 10 hours at 1000° C.

13. The composition as claimed in claim 11, the composition being capable of having a specific surface area of at least 50 m²/g after calcining for 10 hours at 1000° C.

14. The composition as claimed in claim 12, the composition being capable of having a specific surface area of at least 50 m²/g after calcining for 10 hours at 1000° C.

15. The composition as claimed in claim 1, wherein the zirconium oxide and the at least one additive form a solid solution.

16. The composition as claimed in claim 2, wherein the zirconium oxide and the at least one additive form a solid solution.

17. The composition as claimed in claim 1, wherein the additive content is 10% to 30% by weight of additive oxide with respect to the weight of the composition.

18. The composition as claimed in claim 2, wherein the additive content is 10% to 30% by weight of additive oxide with respect to the weight of the composition.

19. The composition as claimed in claim 1, wherein the mesopores are present in an amount of at least 40% of the total pore volume.

20. The composition as claimed in claim 2, wherein the mesopores are present in an amount of at least 40% of the total pore volume.

21. The composition as claimed in claim 1, said composition being capable of having a specific surface area of at least 2 m²/g after calcining for 10 hours at 1200° C.

22. The composition as claimed in claim 2, said composition being capable of having a specific surface area of at least 2 m²/g after calcining for 10 hours at 1200° C.

23. A catalyst support comprising the composition of claim 1.

24. A substrate having a wash coat applied thereon, said wash coat comprising the composition of claim 1.

25. A calcined composition consisting of zirconium oxide and at least one additive, the at least one additive being selected from the group consisting of oxides of praseodymium, lanthanum and neodymium, the composition having mesopores between 10 nm and 500 nm in diameter, the mesopores being present in an amount of at least 30% of the total pore volume, the composition being capable of having a specific surface area of at least 29 m$^2$/g after calcining for 10 hours at 1000° C. and being capable of having a specific surface area of at least 10 m$^2$/g after calcining for 4 hours at 1100° C., wherein the additive content is 5% to 40% by weight of additive oxide with respect to the weight of the composition.

26. The composition as claimed in claim 25, wherein the additive content is 10% to 30% by weight of additive oxide with respect to the weight of the composition.

27. The composition as claimed in claim 25, wherein the mesopores are present in an amount of at least 40% of the total pore volume.

28. The composition as claimed in claim 25, said composition being capable of having a specific surface area of at least 2 m$^2$/g after calcining for 10 hours at 1200° C.

29. A catalyst support comprising the composition of claim 25.

30. A substrate having a wash coat applied thereon, said wash coat comprising the composition of claim 25.

\* \* \* \* \*